(12) United States Patent
Huang et al.

(10) Patent No.: US 11,434,626 B2
(45) Date of Patent: Sep. 6, 2022

(54) FITTING STRUCTURE OF WATER OUTLET DEVICE AND WATER OUTLET DEVICE

(71) Applicant: Xiamen Solex High-Tech Industries Co., Ltd., Xiamen (CN)

(72) Inventors: Dingwei Huang, Xiamen (CN); Xiaohu Yan, Xiamen (CN); Yicong Xie, Xiamen (CN); Wenjing Xiong, Xiamen (CN); Wenxing Chen, Xiamen (CN)

(73) Assignee: Xiamen Solex High-Tech Industries Co., Ltd., Fujian (CN)

( * ) Notice: Subject to any disclaimer, the term of this patent is extended or adjusted under 35 U.S.C. 154(b) by 178 days.

(21) Appl. No.: 16/937,664

(22) Filed: Jul. 24, 2020

(65) Prior Publication Data
US 2021/0025149 A1    Jan. 28, 2021

(30) Foreign Application Priority Data
Jul. 24, 2019 (CN) .......................... 201910671511.9

(51) Int. Cl.
*E03C 1/02* (2006.01)
*E03C 1/04* (2006.01)
*F16L 3/12* (2006.01)

(52) U.S. Cl.
CPC ............ *E03C 1/023* (2013.01); *E03C 1/0403* (2013.01); *F16L 3/1222* (2013.01); *E03C 2001/0415* (2013.01)

(58) Field of Classification Search
CPC .................. E03C 1/023; E03C 1/0403; E03C 2001/0415; F16L 3/1222

USPC ............................................................. 4/676
See application file for complete search history.

(56) References Cited

U.S. PATENT DOCUMENTS

| | | | |
|---|---|---|---|
| 2012/0018020 A1* | 1/2012 | Moore ................. | E03C 1/0403 137/801 |
| 2012/0285569 A1* | 11/2012 | Wu ....................... | E03C 1/0403 137/801 |
| 2017/0101765 A1* | 4/2017 | Song ..................... | E03C 1/0402 |
| 2018/0320344 A1* | 11/2018 | Lin ....................... | E03C 1/0403 |
| 2020/0041012 A1* | 2/2020 | Chang ................... | E03C 1/025 |

* cited by examiner

*Primary Examiner* — Huyen D Le
(74) *Attorney, Agent, or Firm* — Cooper Legal Group, LLC

(57) ABSTRACT

Disclosed is a fitting structure of a water outlet device. The fitting structure comprises a fixed block, hoses, and joints. A peripheral of the fixed block comprises first position holes configured to be fixedly disposed with the hoses. The joints are fixedly connected to first ends of the hoses disposed above an upper surface of the fixed block, and each of the joints comprises a first water outlet passage and a second water outlet passage in communication with the first water outlet passage. An axis of each of the first water outlet passages and an axis of a corresponding one of the hoses is coaxial. The second water outlet passage is parallel to and is staggered with the first water outlet passage by a preset distance. The joints are staggered with the hoses by the preset distance in a radial direction and an outward direction of the fixed block.

17 Claims, 11 Drawing Sheets

FITTING STRUCTURE OF WATER OUTLET DEVICE AND WATER OUTLET DEVICE

RELATED APPLICATION

This application claims priority to Chinese Patent Application 201910671511.9, filed on Jul. 24, 2019. Chinese Patent Application 201910671511.9 is incorporated herein by reference.

FIELD OF THE DISCLOSURE

The present disclosure relates to a water outlet device, and in particular relates to a fitting structure of a water outlet device and the water outlet device.

BACKGROUND OF THE DISCLOSURE

A fitting structure is mainly used for mounting the water inlet and the water outlet of a water outlet device to water pipes. For example, a pull-out type faucet generally comprises five hoses: a cold water inlet hose, a hot water inlet hose, a mixing water outlet hose, a raw water inlet hose, and a pure water outlet hose. As the mounting hole of the water outlet device is a standard size (e.g., the diameter of the mounting hole is only 29.5 mm) and the five hoses are respectively connected to different water outlets or different water inlets of a valve core of the water outlet device, the five hoses cannot be completely gathered together. Therefore, there is no guarantee that the five hoses connected to the valve core can pass through the mounting hole. It is often necessary to make several of the five hoses thinner, resulting in restricted water flow in these hoses.

BRIEF SUMMARY OF THE DISCLOSURE

The present disclosure provides a fitting structure of a water outlet device to enable the plurality of water pipes to pass through a mounting hole with a diameter of 29.6 mm to ensure a proper flow volume.

In order to solve the aforementioned technical problems, a first technical solution of the present disclosure is as follows.

A fitting structure of a water outlet device comprises a fixed block, a plurality of water pipes, and one or more joints. The plurality of water pipes comprises a plurality of hoses.

A peripheral of the fixed block comprises one or more first position holes configured to be fixedly disposed with the plurality of hoses. The one or more joints are fixedly connected to first ends of the plurality of hoses disposed above an upper surface of the fixed block, and each of the one or more joints comprises a first water outlet passage and a second water outlet passage in communication with the first water outlet passage. An axis of each of the first water outlet passages and an axis of a corresponding one of the plurality of hoses is coaxial. The second water outlet passage is parallel to and is staggered with the first water outlet passage by a preset distance. The one or more joints are staggered with the plurality of hoses by the preset distance in a radial direction and an outward direction of the fixed block.

In a preferred embodiment, a portion of each of the one or more joints corresponding to the first water outlet passage is disposed in the corresponding one of the plurality of hoses.

In a preferred embodiment, a hardness of the portion of each of the one or more joints corresponding to the first water outlet passage is greater than a hardness of the corresponding one of the plurality of hoses to enable portions of the plurality of hoses where the one or more joints are disposed to be clamped to the one or more first position holes.

In a preferred embodiment, the one or more first position holes are respectively connected to an edge of the fixed block.

In a preferred embodiment, an inner side of the one or more first position holes is disposed with a second position hole configured to enable a pulling pipe or a hose to pass through.

In a preferred embodiment, the second position hole is connected to the one or more first position holes.

In a preferred embodiment, the plurality of hoses and the pulling pipe located below the fixed block pass through a mounting hole having a diameter of 29.6 mm.

In a preferred embodiment, the plurality of hoses comprises five hoses.

A second technical solution of the present disclosure is as follows.

A water outlet device comprises a valve core, a valve seat, and the fitting structure. The valve core is fixedly connected to the valve seat, second ends of the one or more joints disposed with the second water outlet passages are disposed in the valve core and are in communication with one or more water inlets or one or more water outlets of the valve core.

In a preferred embodiment, the one or more joints are disposed in a portion of the valve seat disposed with the one or more water inlet or the one or more water outlets, and seal rings are disposed between outer peripheries of the one or more joints and one or more inner walls of the one or more water inlets or one or more inner walls of the one or more water outlets.

Compared with existing techniques, the technical solution of the present disclosure has the following advantages.

The present disclosure discloses a fitting structure of a water outlet device. A plurality of hoses are disposed in the one or more joints, and each of the one or more joints comprises a first water outlet passage and a second water outlet passage in communication with the first water outlet passage. An axis of each of the first water outlet passages and an axis of a corresponding one of the plurality of hoses is coaxial. The second water outlet passage is parallel to and is staggered with the first water outlet passage by a preset distance, so that the one or more joints are staggered with the plurality of hoses by the preset distance in a radial direction and extends outward from the fixed block. Therefore, when the plurality of hoses are disposed in the one or more joints, a diameter of a space of a first end defined by the one or more joints is large, while a diameter of a space of a second end defined by the plurality of hoses is small, so that the first end defined by the one or more joints provides a sufficient space to be connected to the valve core, and the second end defined by the plurality of hoses is small enough to pass through a standard mounting hole with a diameter of 29.5 mm. In this way, the structure can be disposed in the standard mounting hole, a space of the standard mounting hole is large enough to install five hoses and a pulling pipe to maximize a space utilization rate, and sizes of the plurality of hoses do not need to be reduced. A water outlet of a water outlet device has a relatively large flow volume, and the flow volume is not reduced when the five hoses are installed.

DETAILED DESCRIPTION OF THE EMBODIMENTS

Figure 1:
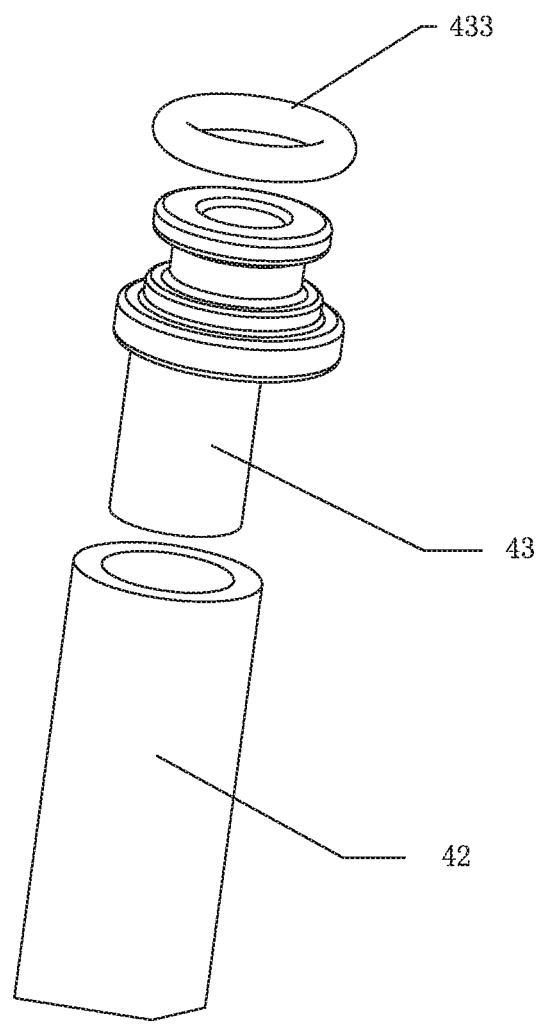
FIG. 1 illustrates a perspective view of a connection of a joint and a hose of Embodiment 1 of the present disclosure.
Figure 2:
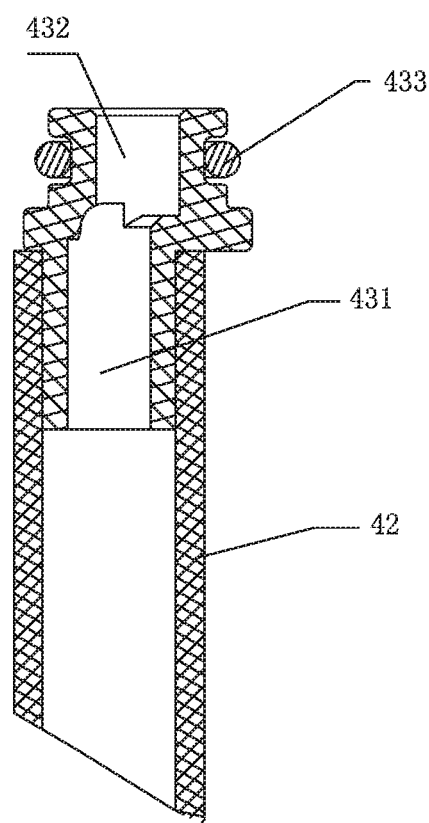
FIG. 2 illustrates a cross-sectional view of the connection of the joint and the hose of Embodiment 1 of the present disclosure.
Figure 3:
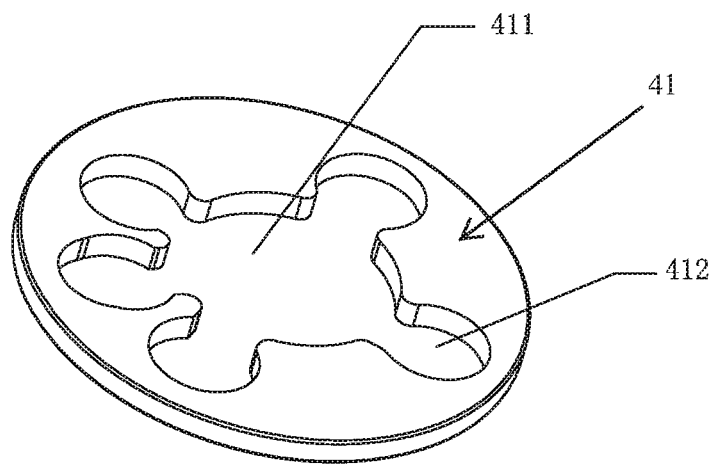
FIG. 3 illustrates a perspective view of a fixed block of Embodiment 1 of the present disclosure.
Figure 4:
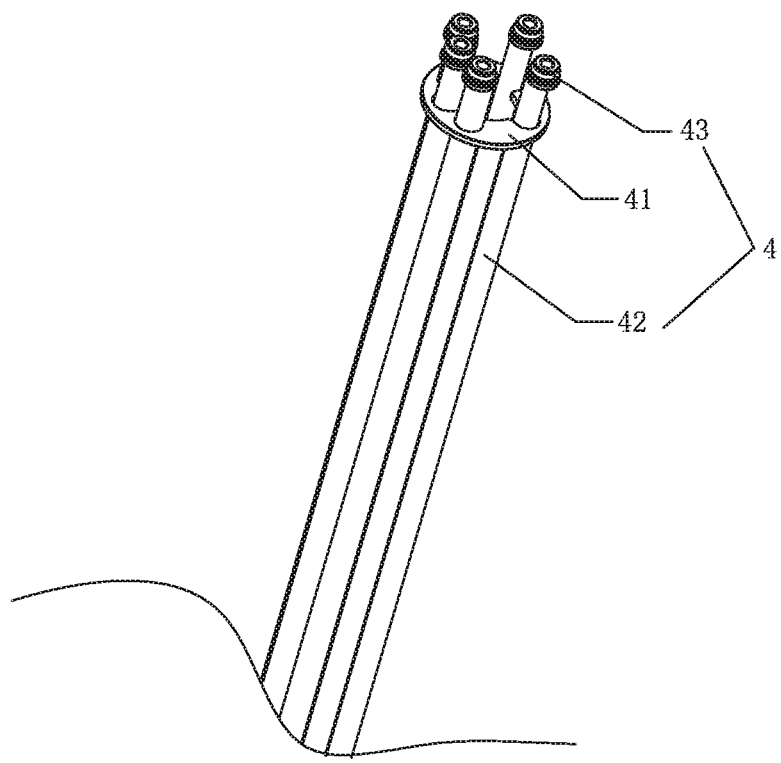
FIG. 4 illustrates a perspective view of an assembly of the hose and the fixed block of Embodiment 1 of the present disclosure.
Figure 5:
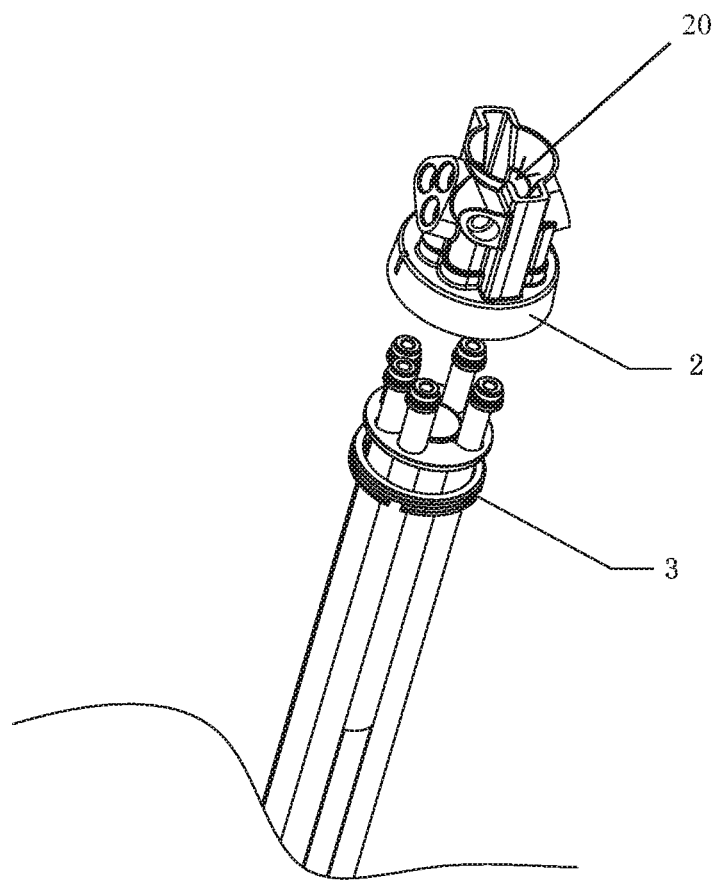
FIG. 5 illustrates a perspective view of an assembly of the joint and a valve core in Embodiment 1 of the present disclosure.
Figure 6:
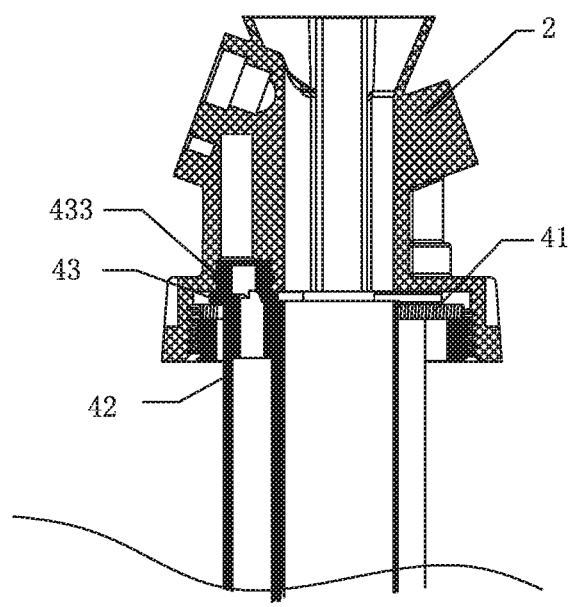
FIG. 6 illustrates a cross-sectional view of a mounting of the joint and the valve core of Embodiment 1 of the present disclosure.
Figure 7:
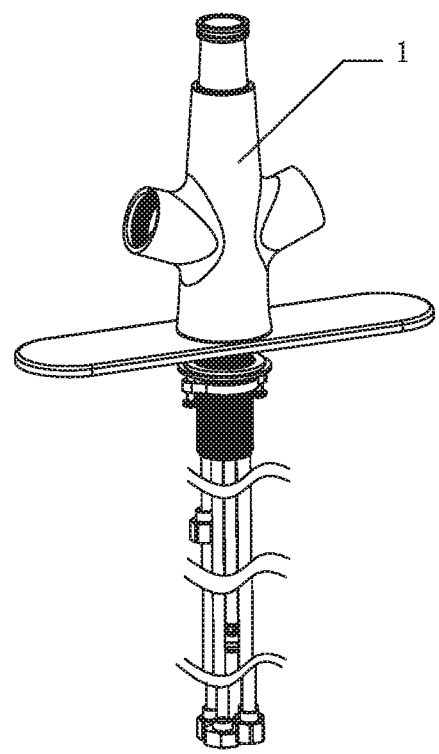
FIG. 7 illustrates a perspective view of a water outlet device of Embodiment 1 of the present disclosure.

The present disclosure will be further described below with reference to the drawings and embodiments.

Embodiment 1

Referring to FIGS. 1-7, a water outlet device comprises a casing 1, a valve seat 2, a fixing assembly 3, and a fitting structure 4 of a water outlet device. The valve seat 2 is configured to be fixedly disposed with a valve core 20.

The fitting structure 4 is mainly used as a water inlet and a water outlet of the water outlet device. For example, a pull-out type faucet may have five hoses: a cold water inlet hose, a hot water inlet hose, a mixing water outlet hose, a raw water inlet hose, and a pure water outlet hose. Since a mounting hole of a mounting table/counter is a standard size (e.g., the diameter of the mounting hole is only 29.5 mm) and the five hoses are respectively connected to different water outlets or different water inlets of the valve seat 2, the five hoses cannot be completely gathered together. Therefore, there is no guarantee that the five hoses connected to the valve core 20 can pass through the mounting hole. It is often necessary to make several hoses of the five hoses thinner, resulting in restricted water flow in these hoses. The fitting structure 4 of this embodiment can satisfy the aforementioned two conditions concurrently and does not reduce diameters of the five hoses. The fitting structure 4 comprises a fixed block 41, water pipes, and one or more joints 43. The water pipes comprise a pulling pipe and the five hoses 42.

An axial center of the fixed block 41 comprises a second position hole 411 configured to receive the pulling pipe, and a peripheral of the fixed block 41 (e.g., an outer circumference of second position hole 411) is further disposed with one or more first position holes 412 configured to be fixedly disposed with the five hose 42. The one or more first position holes 412 are connected to the second position hole 411.

The one or more joints 43 are fixedly connected to first ends of the five hoses 42 disposed above an upper surface of the fixed block 41. Each of the one or more joints 43 comprises a first water outlet passage 431 and a second water outlet passage 432 in communication with the first water outlet passage 431. An axis of each of the first water outlet passages 431 and an axis of a corresponding one of the five hoses 42 are coaxial. The second water outlet passage 432 is parallel to and is staggered with the first water outlet passage 431 by a preset distance. Therefore, each of the one or more joints 43 is staggered with the corresponding one of the five hoses 42 by the preset distance in a radial direction and extends outward from the fixed block 41.

Due to the aforementioned arrangement, a diameter of a combination of the one or more joints 43 is larger than a diameter of a combination of the five hoses 42, so that the combination of the one or more joints provides sufficient space to be connected to the valve seat 2 while the combination of the five hoses 42 is small enough to pass through a standard mounting hole with a diameter of 29.5 mm. In this way, the structure can be disposed in the standard mounting hole, a space of the standard mounting hole is large enough to accommodate the five hoses 42 and the pulling pipe to maximize a space utilization rate, and sizes of the five hoses 42 do not need to be reduced. Therefore, a flow volume of the water outlet of the water outlet device can meet standardization requirements, and the flow volume will not decrease due to an installation of the five hoses 42.

A portion of each of the one or more joints 43 corresponding to the first water outlet passage 431 is disposed in the corresponding one of the five hoses 42 to enable the one or more joints 43 to be connected to the five hoses 42. In addition, a hardness of the portion of each of the one or more joints 43 corresponding to the first water outlet passage 431 is greater than a hardness of the corresponding one of the five hoses 42. Therefore, portions of the five hoses 42 where the one or more joints 43 are disposed are relatively hard to enable the one or more joints 43 clamped to the one or more first position holes 412 to be fixedly connected to the five hoses 42 due to hardness of the portions. During an installation, the five hoses 42 are first disposed in the one or more first position holes 412, and then the five hoses 42 is connected to enable the portions where the one or more joints 43 are disposed in the five hoses 42 to move to the one or more first position holes 412 and be clamped to the one or more first position holes 412.

Further, second ends of the one or more joints 43 disposed with the second water outlet passages 432 are disposed in the valve seat 2 and are in communication with one or more water inlets and one or more water outlets of the valve seat 2. The one or more joints 43 are disposed in a portion of the valve seat 2 disposed with the one or more water inlets or the one or more water outlets, and one or more seal rings 433 are disposed between outer peripheries of the one or more joints 43 and one or more inner walls of the one or more water inlets or one or more inner walls of the one or more water outlets.

When the five hoses 42 are disposed on the fixed block 41, the fixing assembly 3 surrounds an outer side of the five hoses 42 and is disposed under the fixed block 41, the fixing assembly 3 is fixedly engaged with a bottom of the valve seat 2, and the five hoses 42 (and the one or more joints 43) are disposed in the portion of the valve seat 2 corresponding to the one or more water inlets or the one or more water outlets to achieve an simultaneous assembly of the five hoses 42. When disassembled, the five hoses 42 can simultaneously be separated from the valve seat 2 when the fixing assembly 3 is separated from the valve seat 2 to realize a simultaneous disassembly of the five hoses.

Embodiment 2

Figure 8:
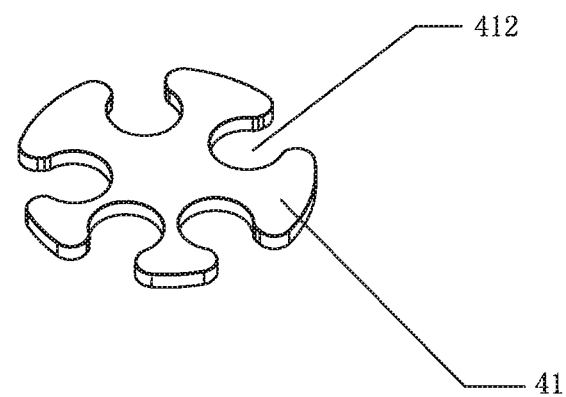
FIG. 8 illustrates a perspective view of a fixed block of Embodiment 2 of the present disclosure.
Figure 9:
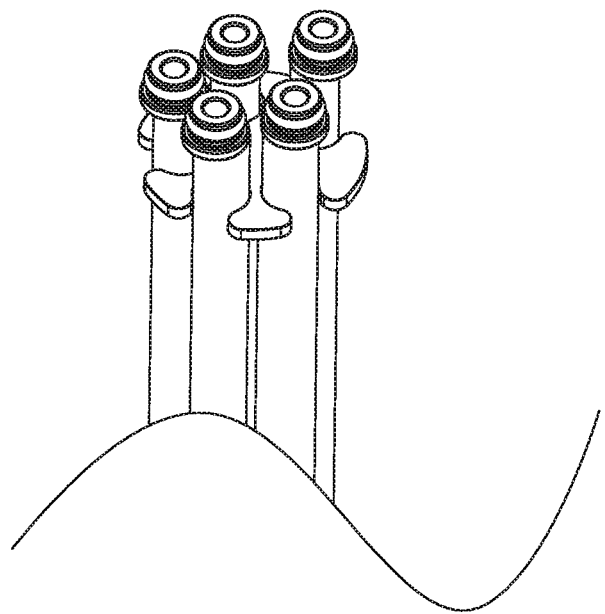
FIG. 9 illustrates a perspective view of an assembly of a hose and a fixed block of Embodiment 2 of the present disclosure.

Referring to FIGS. 8 and 9, this embodiment differs from Embodiment 1 in that this embodiment does not comprise the second position hole 411. Further, each of the one or more first position holes 412 is respectively connected to an edge of the fixed block 41, so that the five hoses 42 are fixedly disposed in the one or more first position holes 412 from the edge of the fixed block 41 conveniently. The rest structure of this embodiment is the same as that of Embodiment 1.

Embodiment 3

Figure 10:
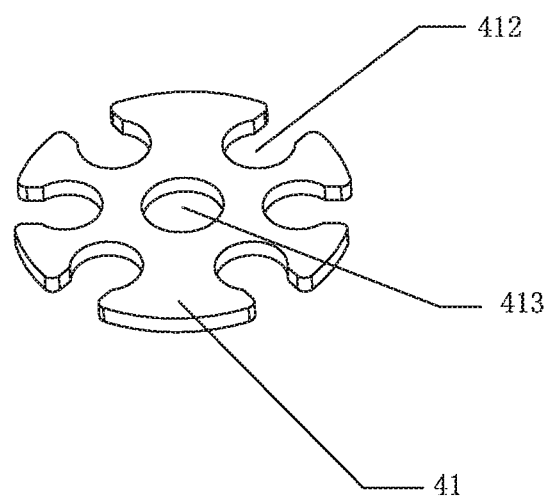
FIG. 10 illustrates a perspective view of a fixed block of Embodiment 3 of the present disclosure.
Figure 11:
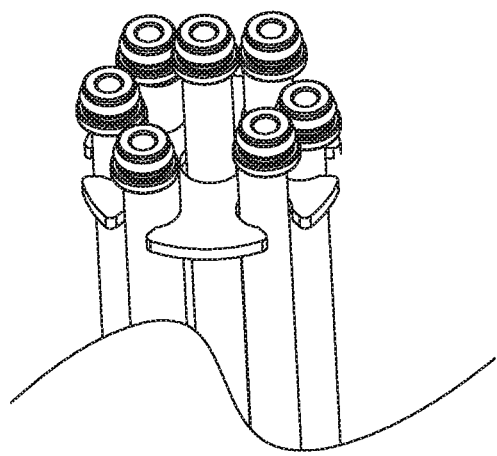
FIG. 11 illustrates a perspective view of an assembly of a hose and a fixed block of Embodiment 3 of the present disclosure.

Referring to FIGS. 10 and 11, this embodiment differs from Embodiment 2 in that a third position hole 413 is further disposed on an inner side of the one or more first position holes 412, and the third position hole 413 is not connected to the one or more first position holes 412. The five hoses 42 pass through the one or more first position holes 412 to obtain a technical solution comprising six hoses. The five hoses 42 fixedly connected to the one or more first position holes 412 are respectively the hot water inlet hose, the cold water inlet hose, a cold water outlet hose, the pure water outlet hose, and a soda water outlet hose (i.e., an aerated water outlet hose). The hose connected to the third position hole 413 is a boiling water outlet hose.

It will be apparent to those skilled in the art that various modifications and variation can be made in the present disclosure without departing from the spirit or scope of the disclosure. Thus, it is intended that the present disclosure cover the modifications and variations of this disclosure provided they come within the scope of the appended claims and their equivalents.

What is claimed is:

1. A fitting structure of a water outlet device, comprising:
a fixed block,
a plurality of water pipes, and
one or more joints, wherein:
the plurality of water pipes comprises a plurality of hoses,
a peripheral of the fixed block comprises one or more first position holes configured to be fixedly disposed with the plurality of hoses,
the one or more joints are fixedly connected to first ends of the plurality of hoses disposed above an upper surface of the fixed block,
each of the one or more joints comprises a first water outlet passage and a second water outlet passage in communication with the first water outlet passage,
an axis of each of the first water outlet passages and an axis of a corresponding one of the plurality of hoses is coaxial,
the second water outlet passage is parallel to and is staggered with the first water outlet passage by a preset distance, and
the one or more joints are staggered with the plurality of hoses by the preset distance in a radial direction and extends outward from the fixed block.

2. The fitting structure of the water outlet device according to claim 1, wherein a portion of each of the one or more joints corresponding to the first water outlet passage is disposed in the corresponding one of the plurality of hoses.

3. The fitting structure of the water outlet device according to claim 2, wherein a hardness of the portion of each of the one or more joints corresponding to the first water outlet passage is greater than a hardness of the corresponding one of the plurality of hoses to enable portions of the plurality of hoses where the one or more joints are disposed to be clamped to the one or more first position holes.

4. The fitting structure of the water outlet device according to claim 1, wherein each of the one or more first position holes is respectively connected to an edge of the fixed block.

5. The fitting structure of the water outlet device according to claim 1, wherein an inner side of the one or more first position holes is disposed with a second position hole configured to enable a pulling pipe or a hose to pass through.

6. The fitting structure of the water outlet device according to claim 5, wherein the second position hole is connected to the one or more first position holes.

7. The fitting structure of the water outlet device according to claim 5, wherein the plurality of hoses and the pulling pipe located below the fixed block pass through a mounting hole having a diameter of 29.6 mm.

8. The fitting structure of the water outlet device according to claim 7, wherein the plurality of hoses comprises five hoses.

9. A water outlet device, comprising:
a valve core,
a valve seat, and
the fitting structure according to claim 1, wherein:
the valve core is fixedly connected to the valve seat, and
second ends of the one or more joints disposed with the second water outlet passages are disposed in the valve core and are in communication with one or more water inlets or one or more water outlets of the valve core.

10. The water outlet device according to claim 9, wherein:
the one or more joints are disposed in a portion of the valve seat disposed with the one or more water inlet or the one or more water outlets, and
seal rings are disposed between outer peripheries of the one or more joints and one or more inner walls of the one or more water inlets or one or more inner walls of the one or more water outlets.

11. The water outlet device according to claim 10, wherein a hardness of the portion of each of the one or more joints corresponding to the first water outlet passage is greater than a hardness of the corresponding one of the plurality of hoses to enable portions of the plurality of hoses where the one or more joints are disposed to be clamped to the one or more first position holes.

12. The water outlet device according to claim 9, wherein a portion of each of the one or more joints corresponding to the first water outlet passage is disposed in the corresponding one of the plurality of hoses.

13. The water outlet device according to claim 9, wherein each of the one or more first position holes is respectively connected to an edge of the fixed block.

14. The water outlet device according to claim 9, wherein an inner side of the one or more first position holes is disposed with a second position hole configured to enable a pulling pipe or a hose to pass through.

15. The water outlet device according to claim 14, wherein the second position hole is connected to the one or more first position holes.

16. The water outlet device according to claim 14, wherein the plurality of hoses and the pulling pipe located below the fixed block pass through a mounting hole having a diameter of 29.6 mm.

17. The water outlet device according to claim 16, wherein the plurality of hoses comprises five hoses.

* * * * *